2,955,550

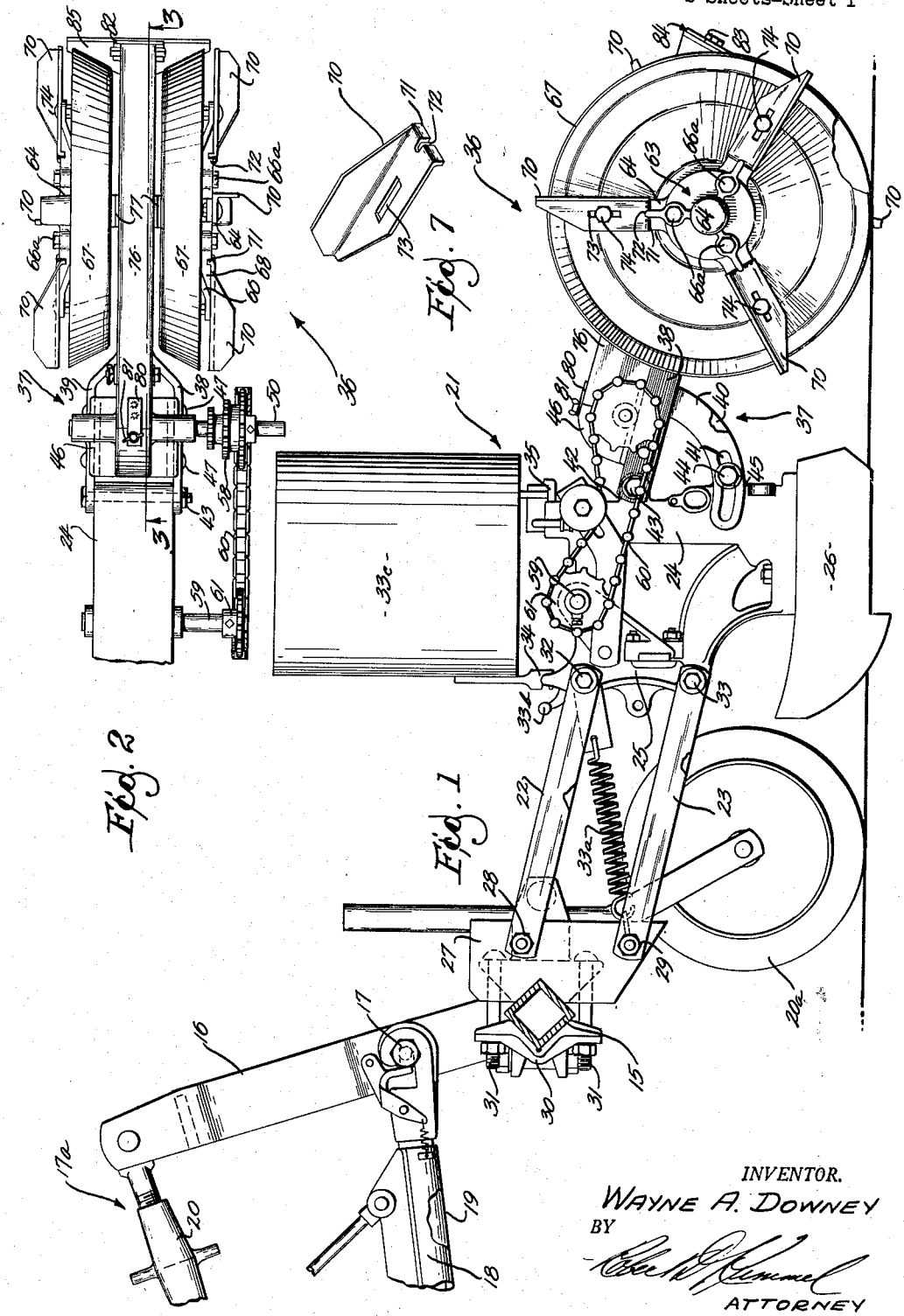

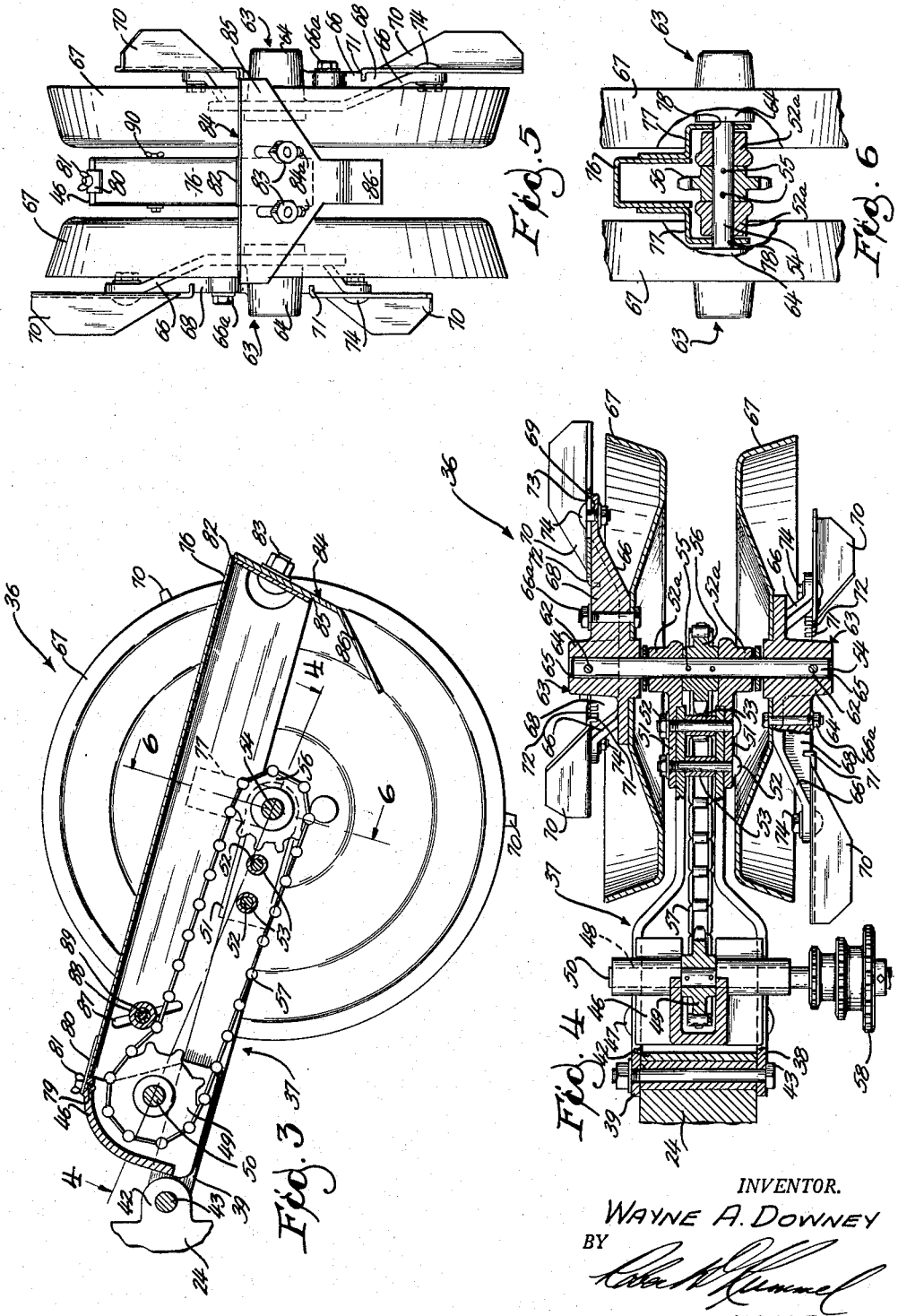

GROUND DRIVEN SEED DISPENSING MACHINE

Wayne A. Downey, East Moline, Ill., assignor to J. I. Case Company, Racine, Wis., a corporation of Wisconsin Continuation of abandoned application Ser. No. 272,281, Feb. 19, 1952. This application Feb. 29, 1956, Ser. No. 572,184

3 Claims.  (Cl. 111—59)

The present invention relates to seed-dispensing machinery and more particularly to a seed-dispensing machine of the ground driven type, and it is a primary object of the present invention to improve the operation and construction of machines of this type. This application is a continuation of the copending application of Wayne A. Downey, filed February 19, 1952, Serial No. 272,281, now abandoned.

More specifically an object of the invention is to provide a press wheel combination in which one of the elements serves as a structural member to support and co-ordinate the other members, while also serving as a shield to keep dirt away from the drive train.

Other objects of the present invention will be apparent to those skilled in the art upon a perusal of the following description and claims read in the light of the accompanying drawings wherein:

Fig. 1 is a left side elevational view of a ground driven seed dispensing machine shown in combination with a propelling vehicle, with parts removed and with parts broken away.

Fig. 2 is a plan view of certain structure shown in Fig. 1, with parts removed.

Fig. 3 is a vertical sectional view taken on the line 3—3 of Fig. 2, slightly enlarged.

Fig. 4 is a sectional view taken on the line 4—4 of Fig. 3.

Fig. 5 is a rear view of the structure shown in Fig. 3.

Fig. 6 is a substantially vertical cross sectional detail view taken on the line 6—6 of Fig. 3.

And Fig. 7 is a perspective view of one of the driving lugs.

Referring to the drawings and particularly to Fig. 1 thereof, a tool bar 15 is positioned rearwardly of a tractor and is provided with a suitable mast 16 having transversely-spaced attaching arms 17, and a suitable draft and lifting linkage 17a including rearwardly extending hitch arms 18 and 19 and a middle link 20 is suitably connected to the respective attaching arms 17 and mast 16 by any well known means for draft connecting the tool bar 15 with the tractor as well known in the art. Suitable means, not shown, are provided on the tractor for permitting adjusted vertical swinging movement of the hitch arms 18 and 19 as well known in the art so that the tractor and the tool bar 15 provide a suitable tool supporting structure to which a self-contained ground driven seed dispensing unit can be readily attached as will appear presently. Suitable gage wheels 20a, only one of which is shown, are carried adjacent the opposite ends of the tool bar 15 for movably supporting the tool bar 15 a predetermined distance from the ground as well known in the art and as will be more fully appreciated hereinafter.

A seed dispensing unit, designated generally as 21 is positioned rearwardly of the tool bar 15 and is swingably connected thereto by means of upper and lower parallel links 22 and 23 respectively. More specifically the seed dispensing unit 21 comprises a seed spout structure 24 having a forwardly extending attaching portion or frame 25, spout 24 and portion 25 being in the form of a casting, and a suitable boot 26 is suitably fastened to the bottom of the spout 24 for well known purposes. The upper and lower links 22 and 23 respectively are pivotally secured on opposite sides of an attaching bracket 27 by means of suitable bolts or the like 28 and 29, and the attaching bracket 27 is adapted to fit over a portion of the tool bar 15 and is clamped thereto by means of a suitable clamping bracket 30 and bolts 31. Rearwardly the links 22 and 23 are pivotally secured on opposite sides of the portion 25 of the spout 24 by means of suitable bolts 32 and 33 respectively so that the seed dispensing unit 21 is capable of independent vertical swinging movement with respect to the tool bar 15. A spring 33a is anchored diagonally between the links 22 and 23 for urging the seed dispensing unit 21 to swing into the soil, and the portion 25 has an abutment 33b extending forwardly between the links 22 so as to provide a stop for swinging movement of the links 22 and 23 in one direction so that the seed dispensing unit can be moved into a raised or traveling position by means of arms 18 and 19 and middle link 20 as well known in the art. A seed can 33c is carried adjacent the upper end of the seed spout 24 and clamped thereto by suitable means such as shown at 34 and 35, and suitable dispensing means, not shown, are enclosed in the can 33c for dispensing a predetermined number of seeds into the seed spout 24 and accordingly through the hollow rear portion of the boot 26 in accordance with the speed of forward movement of the machine as will be more clearly described hereinafter.

A combination drive and press wheel unit is carried rearwardly of the seed dispensing unit 21 and is designated generally as number 36. The drive and press wheel 36 comprises a subframe 37 including rearwardly extending parallel arms 38 and 39 and downwardly and forwardly extending arcuate portions 40 provided respectively with an arcuate slot 41. The members 38 and 39 are swingably secured to opposite sides of a suitable boss 42, formed adjacent the rearward end of the spout 24, by means of a suitable bolt pivot or the like 43, and the subframe 37 is permitted to swing about the axis of the bolt 43 and is capable of being locked in various adjusted positions with respect thereto by means of a bolt 44 which is received by a suitable boss 45 formed on the spout 24, the bolt 44 extending on opposite ends thereof through the respective slots 41 and capable of being tightened so that the swinging movement of the subframe 37 about the axis of bolt 43 can be locked in various adjusted positions within the range of swinging movement permitted by the arcuate slots 41. The members 38 and 39 carry a housing 46 by means of suitable bolts or the like 47, see Figs. 1 and 4. The housing 46 is formed with a transverse bore 48 and the central part of the housing is hollowed so as to accommodate therein a suitable sprocket 49. The sprocket 49 is fixed to a countershaft 50 which is journaled in the transverse bore 48. Rearwardly the members 38 and 39 have fixed thereto rearwardly extending plates 51 by means of suitable bolts or the like 52, and the respective plates 51 carry adjacent the ends thereof suitable bearings 52a. The bolts 52 receive therebetween suitable spacers 53 so as to aid in keeping the respective members 38 and 39 in suitable spaced apart relationship. A driving shaft or axle 54 is journaled in the respective bearings 52a and is positioned substantially parallel to the shaft 50 of the sprocket 49. Fixed in driving relationship to the shaft 54 by means of suitable pins or the like 55 is a driving sprocket 56 which is positioned in driving alignment with respect to the sprocket 49 and which is drivingly connected thereto by means of a suitable chain or the like 57. It will be appreciated that the sprocket 49 will be driven in accordance with the rotation imparted to the shaft 54. One end of the shaft 50 extends laterally of the housing 46 and has fixed adjacent the end thereof a suitable gear cluster 58 of well-known construction. Gear cluster 58 is drivingly connected to a seed shaft or driven member 59 of the seed dispensing unit 21 by means of a suitable chain 60 and a driven sprocket 61 fixed adjacent the end of the seed shaft 59 and in driving alignment with respect to the gear cluster 58. It will be appreciated that the seed shaft 59 upon being driven in the proper direction will dispense the seeds carried in the seed can 33c into the seed spout 24 by well-known mechanism, not shown in the present drawings and not considered as a part of the present invention, the seeds being dispensed into the seed spout 24 being deposited into the ground through the rearward open end of the stub runner or boot 26.

Adjacent the opposite ends of the axle shaft 54 are fixed by means of suitable pins or the like 62 suitable wheel hubs designated as 63 respectively. The wheel hubs 63 are each provided with a central hub portion 64 which has formed therein a suitable bore 65 for receiving the axle shaft 54. Radially extending arms 66 extend from the central hub portion 64 and are preferably three in number and equally spaced about the circumference thereof, the radially extending arms 66 of one hub being staggered with respect to the radially extending arms 66 of the other hub. Fixed to the inner face of the respective hubs 64 as by suitable bolts or the like 66a are suitable press wheels designated as 67 which are shaped, in the illustrative embodiment, substantially as a shallow frustum of a cone and so positioned with respect to one another that the circumferential surfaces thereof are in earth pressing relationship with respect to the ground traversed for setting the seeds firmly in the ground as well known in the art. The radial arms 66 extend radially and laterally of the respective hub portions 64, and they are each provided with a radially and laterally extending ridge 68, and adjacent the outer end of each arm 66 is formed an opening 69.

Ground engaging lugs 70, each being substantially angularly-shaped in cross section and being provided adjacent one end thereof with an inwardly bent portion 71 having a notch 72 formed therein, are adjustably fixed with the respective hub portions 64 so as to provide a traction device for the rear press wheels 67 so as to enable the wheels to maintain their proper engagement with respect to the soil under all types of soil conditions, see also Fig. 7. More specifically the lugs 70 are each provided with a suitable slot or guide way 73 which is in alignment with the opening 69 formed in the associated arm 66 and a suitable bolt 74 is received in the aligned opening 69 and slot 73 for holding the lug with respect to sliding movement in radially extending adjusted positions within the limits permitted by the guide way 73. The notch 72 formed in the downwardly bent portion 71 of each of the ground lugs 70 is received by the associated radially extending rib 68 so as to prevent swinging movement of the ground lugs about the axis of the bolts 74 when the machine is in operation. The lugs 70 are also preferably positioned with respect to the direction of rotation of the press wheels 67 so that the laterally extending portion of each angular-shaped lug is in trailing position with respect to its fore-and-aft extending portion.

It will be appreciated that the driving lugs 70 can each be adjusted radially from a position wherein they barely extend beyond the peripheral edge of the respective press wheels 67 to a position wherein they extend substantially therebeyond, such as, two inches. Since machines of this type are adapted for use in many different types of soil, and since on a single farm, the condition of the soil might vary from one day to the next depending upon the amount of moisture contained in the soil, it has been found highly desirable that some adjustable means be provided on the driving wheels 67 for enabling the operator through a simple adjustment to regulate the coefficient of friction between the driving wheels and the soil. More specifically it will be appreciated that in very loose or sandy soil it is desirable that the lugs 70 should be extended to their maximum radial position or substantially close to their maximum radial position so that the press wheels upon forward travel of the machine will transmit a uniform and continuous rate of motion to the seed shaft 59 of the seed dispensing unit 21. While the driving lugs 70 would be in their foremost radial positions when the machine is being operated in loose sandy soil, the lugs are capable of adjustment so that if the machine is in use on hard firm soil, the lugs can be positioned so as to barely extend beyond the periphery of the respective press wheels 64, and in some instances it might be preferable to move the lugs inwardly towards the axis of the press wheels 67 so that they do not extend beyond the periphery at all. While a seeding machine which is ground driven from the press wheels 67 is in certain respects more advantageous than a tractor driven seed dispensing unit since the ratio of drive of the driving mechanism is not altered for different tractors or for different sizes of wheels that are disposed on the tractors, it is highly important that the driving wheel be so constructed as to transmit a uniform rate of motion to the seed dispensing unit in accordance with the forward speed of the tractor and that the tendency of the driving wheel to slip under certain soil conditions be eliminated. As previously suggested, the combination drive and press wheel of the present invention is so constructed as to be applicable to all types of soil conditions. It will also be appreciated that the ground lugs 70 are carried laterally of the respective press wheels 67 sufficiently to cause no disturbance to the seeds being set in the ground.

Since the driving lugs 70 and the respective press wheels 67 have a tendency to pick up a certain amount of soil upon forward movement of the machine and to deposit the same upon the sprockets 56 and 49 and the driving chain 57, I have provided a suitable protective shield 76, see also Figs. 5 and 6. More specifically the shield 76 comprises a downwardly-open rectangular box or channel structure which intermediate the ends thereof is provided with brackets 77 depending from the opposite sides thereof. The brackets 77 are provided with suitable aligned openings 78, and the driving shaft 54 is received in the respective openings 78, the respective brackets 77 being positioned between the respective bearings 52 and hubs 64. It will be appreciated that by this construction the protective shield 76 is swingable about the axis of the driving shaft 54. Forwardly the protective shield is open and the front edge of the respective sides thereof are so formed as to coincide with the rearward surface of the housing 46 so as to have a tight fit with respect thereto. The housing 46 has formed therein a suitable tapped opening 79 and the upper surface of the protective shield is provided with a forwardly extending tab 80 which carries a suitable wing nut 81 positioned to be received by the tapped opening 79 when the protective shield 76 is swung forwardly into mating relationship with respect to the housing 46. Rearwardly the shield 76 is provided with a forwardly and downwardly extending end plate 82 which carries therein a pair of suitable cap screws 83, and a dirt scraper 84 is secured to the end plate 82 by means of the machine screw 83. The dirt scraper 84 is provided with a pair of slots 84a which receive the cap screws 83 so that the scraper is capable of various adjusted positions with respect to the end plate 82 within the limits permitted by the slots 84a. The dirt scraper is provided with a generally triangularly shaped portion 85 which is so positioned between the respective press wheels 67 that the oblique sides of the triangular portion 85 substantially coincide with the outer circumferential surfaces of the press wheels 67, and a substantially rectangular portion 86 extends downwardly and forwardly from the generally triangularly shaped portion 85 and is positioned so as to extend inwardly between the respective press wheels 67 sufficiently to prevent the accumulation or deposit of dirt therebetween.

The sides of the shield 76 are provided with aligned diagonally extending slots 87 and a roller 88 is carried between the respective sides of the shield 76 by means of a suitable bolt 89 which is received in the aligned slots 87 and locked in adjusted position by means of a suitable wing nut 90. The roller 88 is carried in the path of travel of the chain 57, and the bolt 88 is so adjusted with respect to the aligned slots 87 as to position the roller in its proper chain tension position.

Having now described my invention, what I claim and desire to protect by Letters Patent is:

1. In a seed planting mechanism of the type comprising a longitudinally disposed main frame draft connected to a source of motive power, carrying a seed dispensing unit including a driven dispensing member, the combination of a countershaft transverse to the path of movement of said main frame, a downwardly open rearwardly directed channel member in which said countershaft is journaled, mounted on said main frame for up and down pivotal movement about a pivot adjacent said countershaft, an axle journaled in said channel member, spaced rearwardly from said countershaft and projecting on either side of said channel member, a press wheel mounted in driving relation on one projecting end of said axle, a press wheel mounted on the other projecting end of said axle, a driving wheel fixed on said axle within said channel member, a driven wheel fixed on said countershaft within said channel member, flexible driving means engaged with said driving and driven wheels so as to lie within the protection of said channel member whereby said flexible driving means is shielded from soil thrown up by said press wheels, and a drive extending from said countershaft to said driven dispensing member.

2. In a seed planting mechanism of the type comprising a longitudinally disposed main frame draft connected to a source of motive power, carrying a seed dispensing unit including a driven dispensing member, the combination of a downwardly open rearwardly directed channel member, a countershaft journaled in said channel member transverse to the path of movement of the main frame, said channel member being mounted on said main frame for up and down pivotal movement about a pivot adjacent said countershaft, an axle journaled in said channel member transverse to said path of movement, spaced rearwardly from said countershaft and projecting on either side of said channel member, a press wheel mounted in driving relation on one projecting end of said axle, a press wheel mounted on the other projecting end of said axle, a driving sprocket fixed on said axle within said channel member, a driven sprocket fixed on said countershaft, a chain engaged with said driving and driven sprockets so as to lie within the protection of said channel member whereby said chain is shielded from soil thrown up by said press wheels, and a drive extending from said countershaft to said driven dispensing member.

3. In a seed planting mechanism of the type comprising a longitudinally disposed main frame draft connected to a source of motive power, carrying a seed dispensing unit including a driven dispensing member, the combination of a subframe in the form of a downwardly open rearwardly directed channel member, a countershaft journaled in said channel member transverse to the path of movement of the main frame, said channel member being mounted on said main frame for up and down pivotal movement about a pivot adjacent said countershaft, an axle journaled in said channel member transverse to said path of movement, spaced rearwardly from said countershaft and projecting on either side of said channel member, a press wheel mounted in driving relation on one projecting end of said axle, a press wheel mounted on the other projecting end of said axle, a driving wheel fixed on said axle within said channel member, a driven wheel fixed on said countershaft, flexible driving means engaged with said driving and driven wheels so as to lie within the protection of said channel member, a drive extending from said countershaft to said driven dispensing member, said channel member extending rearwardly between said press wheels past said axle, and a scraper on the rear end of said channel member and supported by said channel member in position to clear said press wheels of soil tending to adhere thereto, whereby said channel member performs simultaneously the duties of a structural element supporting and co-ordinating the operative parts of the press wheel and drive train, and of a shield protecting the drive train from soil thrown up by the press wheels.

References Cited in the file of this patent

UNITED STATES PATENTS

| | | |
|---|---|---|
| 240,341 | Thomas | Apr. 19, 1881 |
| 270,627 | Bradley | Jan. 16, 1883 |
| 1,029,592 | Cole | June 18, 1912 |
| 2,004,416 | Orelind | June 11, 1935 |
| 2,196,347 | Von Meyenburg | Apr. 9, 1940 |
| 2,200,791 | Frisbie | May 14, 1940 |
| 2,221,769 | Hipple | Nov. 19, 1940 |
| 2,745,330 | Nelson | May 15, 1956 |

FOREIGN PATENTS

| | | |
|---|---|---|
| 364,754 | Germany | Dec. 1, 1922 |